July 19, 1966  C. H. ROSNER  3,262,026
SUPERCONDUCTIVE SOLENOIDS HAVING A FIELD PROBE MOUNTED THEREIN
Filed July 1, 1964
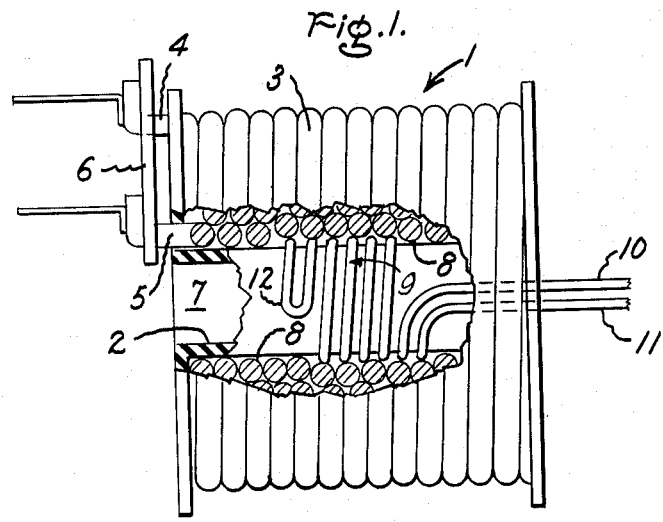
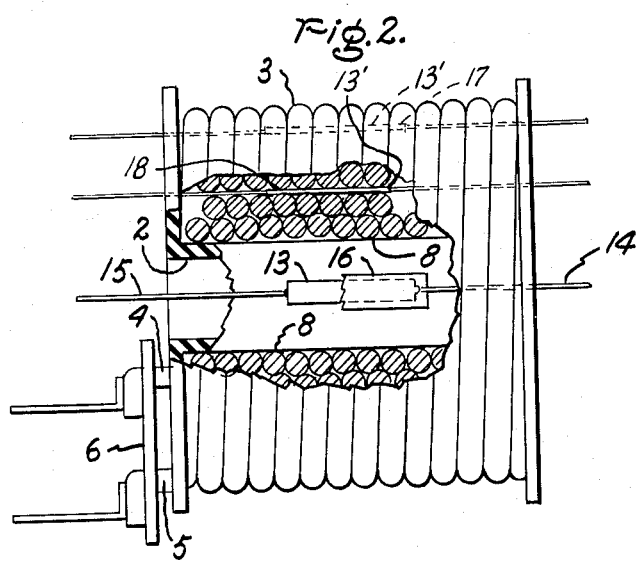
Inventor:
Carl H. Rosner,
by Edward D. Murphy
His Attorney.

3,262,026
SUPERCONDUCTIVE SOLENOIDS HAVING A
FIELD PROBE MOUNTED THEREIN
Carl H. Rosner, Schenectady, N.Y., assignor to General
Electric Company, a corporation of New York
Filed July 1, 1964, Ser. No. 379,635
5 Claims. (Cl. 317—158)

The present invention relates to superconductive apparatus and in particular to superconductive solenoids the magnetic fields of which can be measured at any time or continuously without disturbing such fields.

In presently known superconductive solenoids, used for example in testing various materials to determine the effect of large magnetic fields thereon, difficulties have been encountered in attempting to measure the magnetic field within the solenoid without completely removing the sample from the field or disturbing the field or sample in some manner. In addition, the mechanical connections by means of which the sample is removed and the field measuring probe is inserted extend through the bath which maintains the solenoid at cryogenic temperatures, thereby increasing the difficulty of maintaining the proper temperature.

It is accordingly a principal object of the present invention to provide a practical solution to the problem of measuring the magnetic field of a superconductive solenoid without disturbing the field.

Briefly, in accord with one embodiment of the present invention, a superconductive solenoid is provided for producing a magnetic field. A field probe for monitoring magnetic field conditions and changes therein is mounted adjacent the interior of the solenoid so as to provide for continuous indication of the conditions without interfering with other structure or operations within or adjacent the solenoid. In a specific embodiment the field probe may comprise an element of suitable magneto-resistive material mounted on the mandrel which supports the solenoid.

The novel features believed characteristic of the invention are set forth in the appended claims. The invention itself, together with further objects and advantages thereof may best be understood by reference to the following description taken in connection with the appended drawings in which:

FIG. 1 is a perspective view, partially broken away, of a superconductive solenoid assembly representing a preferred embodiment of the present invention, and FIG. 2 illustrates an alternative embodiment of the present invention.

In FIG. 1, a superconductive solenoid 1 is illustrated which comprises a form or mandrel 2, constructed of metal, plastic or other suitable material, and a coil 3 of superconductive wire such as that disclosed in copending application Serial No. 316,269 (filed October 15, 1963 in the names of Donald L. Martin and Mark G. Benz and assigned to the assignee hereof), the entire specification of which is incorporated herein by reference. The turns of the coil 3 are insulated from one another as is set forth in the copending application. Wire ends 4 and 5 extend from the coil to a terminal board 6 for connection across a potential source (not shown). A magnetic field is produced within the coil by immersing the coil in a cryogenic bath and connecting the terminals to a source of potential. A magnetic filed is produced inside the internal boundary or surface 8 of coil 3 and also extends beyond the ends thereof.

The mandrel 2 is provided with a cylindrical internal region or cavity 7 into which a sample of material may be inserted for purposes of measurement of the effect of the magnetic field on the sample or for measuring the effect of the sample on the magnetic field.

In accord with the present invention, a probe for measuring the magnetic field and any changes therein is provided mounted in the field and adjacent the internal surface 8 in such a manner as not to interfere with operations or structure in or adjacent the coil. The probe 9 illustrated in FIG. 1 comprises a single layer or winding of electrically insulated wire. The ends 10 and 11 thereof extend outside the mandrel 2 for connection to an appropriate indicating device such as an ohmmeter or to a parallel combination of a source of potential and a volt meter.

The wire 9 may comprise any appropriate magnetoresistive material such as commercial or high purity copper, single crystal tungsten or bismuth. The material preferably undergoes a linear resistance change with increasing magnetic field; however, a non-linear material may be used and the indicating meter may be correspondingly calibrated.

In the usual case, the probe wire is wound on and supported by the mandrel 2 and is held in place by the subsequently overwound coil 9. As illustrated in FIG. 1, the winding of the probe coil is preferably bifilar; that is, wound once and then wound back upon itself to eliminate inductive coupling between the probe and the superconductive coil. In the preferred method of assembly, the probe wire is looped as at 12, the doubled wire is then wound on the mandrel and the superconductive wire is then wound over the leads 10 and 11 to hold them in place.

A solenoid embodying an alternative form of the present invention is illustrated in FIG. 2. In this embodiment, the probe, placed on mandrel 2 adjacent the internal surface 8 of coil 3, comprises a strip or axially extending block 13 of appropriate magnetoresistive material having leads 14 and 15 attached thereto for connection to the external indicating circuit. In general, any appropriate form of field probe may be used including any type of magnetoresistive material. Alternatively, a Hall effect probe may be used.

In the illustration of FIG. 2, insulation 16 may be applied to the probe either before or after installation so as to electrically insulate it from the turns of the superconductive coil. The block 13 is supported by the mandrel and may be held in place either by the insulation or by the superconductive coil. It is noted that the supporting mandrel in each of the illustrated cases is included only by way of example and any means for attaching the probe to the inner surface of the coil, for example by using a staking fluid, may be used.

It is further noted that, in either embodiment, additional probes 13′ may be mounted at other locations between the layers of the superconductive coil, for example at 17 and 18, to measure the field gradient across the coil.

While I have shown and described several embodiments of my invention, it will be apparent to those skilled in the art that many changes and modifications may be made therein without departing from my invention. For example, any point of mounting for the field probe may be used which is within range of the magnetic field of the solenoid, the important feature being simply that the probe is mounted adjacent the internal surface of the solenoid in such a location that it does not interfere with operations or structure in or adjacent the cavity. Accordingly, I intend the appended claims to cover all such changes and modifications as fall within the true spirit and scope of my invention.

What I claim as new and desire to secure by Letters Patent of the United States is:

1. In apparatus for generating a magnetic field including a superconductive coil having an internal surface, the combination therewith of a field probe sensitive to magnetic fields, said probe being permanently mounted adjacent said internal surface and positioned to sense a magnetic field generated by said superconductive coil and being electrically insulated from said coil.

2. Apparatus for generating and measuring a magnetic field comprising a mandrel defining an internal cavity; a field probe including an element sensitive to magnetic fields mounted on said mandrel; and a superconductive coil wound over said mandrel and said probe so as to generate a magnetic field within said coil upon the application of a potential source thereto, said superconductive coil being insulated from said probe.

3. The apparatus claimed in claim 2 wherein said field probe element comprises a coil of magnetoresistive material wound over said mandrel.

4. The apparatus claimed in claim 2 wherein said field probe element comprises a strip of material sensitive to magnetic fields overlying a portion of said mandrel.

5. In apparatus for generating a magnetic field including a superconductive coil having an internal surface, the combination of means for measuring the gradient of said magnetic field across said coil comprising a plurality of field probes sensitive to said magnetic field, one of said probes being mounted adjacent said internal surface in said magnetic field, the remaining probes of said plurality being mounted between successive layers of said coil; each of said probes being electrically insulated from said coil.

References Cited by the Examiner
UNITED STATES PATENTS 2,743,416  4/1956  Kelly _____ 324—43
3,015,960  1/1962  Steele.

OTHER REFERENCES

Kunzler, J. E.: Reviews of Modern Physics, vol. 33, No. 4, October 1961, QC 1R 45, pp. 503–504.

New Devices From Magnetic Effects, Electronics, June 1964, pp. 78–80.

BERNARD A. GILHEANY, *Primary Examiner.*

G. HARRIS, JR., *Assistant Examiner.*